(12) United States Patent
Uchiyama

(10) Patent No.: US 9,062,645 B2
(45) Date of Patent: Jun. 23, 2015

(54) FUEL FEED SYSTEM FOR V-TYPE ENGINE

(75) Inventor: Tatsushi Uchiyama, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 667 days.

(21) Appl. No.: 13/161,936

(22) Filed: Jun. 16, 2011

(65) Prior Publication Data

US 2011/0315099 A1    Dec. 29, 2011

(30) Foreign Application Priority Data

Jun. 29, 2010    (JP) ................. 2010-147684

(51) Int. Cl.
| | |
|---|---|
| *F02B 75/22* | (2006.01) |
| *F02M 69/46* | (2006.01) |
| *B62J 37/00* | (2006.01) |
| *F02M 37/00* | (2006.01) |
| *F02M 39/00* | (2006.01) |
| *F02M 55/00* | (2006.01) |
| *F02M 55/02* | (2006.01) |
| *F02M 63/02* | (2006.01) |

(52) U.S. Cl.
CPC .............. *F02M 69/465* (2013.01); *B62J 37/00* (2013.01); *F02M 37/0017* (2013.01); *F02M 39/00* (2013.01); *F02M 55/004* (2013.01); *F02M 55/025* (2013.01); *F02M 63/0295* (2013.01)

(58) Field of Classification Search
USPC .............. 123/54.4, 184.21, 184.31, 445, 447, 123/468–470
See application file for complete search history.

(56) References Cited

U.S. PATENT DOCUMENTS

| | | | | |
|---|---|---|---|---|
| 5,954,031 | A  * | 9/1999 | Ogiso et al. | 123/447 |
| 6,095,105 | A  * | 8/2000 | Lohr et al. | 123/90.38 |
| 7,690,356 | B2 | 4/2010 | Hotta et al. | |
| 2002/0170540 | A1* | 11/2002 | Hirano et al. | 123/463 |
| 2003/0015170 | A1* | 1/2003 | Klotz et al. | 123/306 |
| 2003/0019457 | A1* | 1/2003 | Ozeki | 123/184.34 |
| 2004/0069277 | A1* | 4/2004 | Mizuno et al. | 123/456 |
| 2005/0178371 | A1* | 8/2005 | Sjovall et al. | 123/572 |
| 2006/0027214 | A1* | 2/2006 | Watanabe et al. | 123/468 |
| 2006/0042601 | A1 | 3/2006 | Hotta et al. | |

(Continued)

FOREIGN PATENT DOCUMENTS

| | | |
|---|---|---|
| EP | 1705367 A1 | 9/2006 |
| JP | H03-121250 | 5/1991 |

(Continued)

OTHER PUBLICATIONS

Japanese Office Action, dated Jan. 7, 2014, which issued during the prosecution of Japanese Patent Application No. 2010-147684, which corresponds to the present application.

*Primary Examiner* — John Kwon
*Assistant Examiner* — Johnny H Hoang
(74) *Attorney, Agent, or Firm* — Troutman Sanders LLP

(57) ABSTRACT

The fuel feed system, used for a fuel feed system having an air intake path disposed in a V-form bank space, has injectors for jetting therethrough a fuel into the air intake path, and a delivery pipe for feeding therethrough the fuel to the injectors, wherein the delivery pipe is fixed to, and thereby supported by, the engine, while allowing the top portions of the injectors to be fitted into the delivery pipe, and the included angle formed between a pair of injectors, opposed on the front and rear sides of the delivery pipe placed in between, is set wider than the bank angle of the cylinder banks as viewed in the longitudinal direction or crankshaft.

9 Claims, 10 Drawing Sheets

(56) References Cited

U.S. PATENT DOCUMENTS

| | | | |
|---|---|---|---|
| 2006/0157021 A1* | 7/2006 | Nakagawa | 123/336 |
| 2006/0201457 A1* | 9/2006 | Dieterle | 123/54.4 |
| 2006/0260569 A1* | 11/2006 | Nelson | 123/54.4 |
| 2008/0029062 A1* | 2/2008 | Toriumi et al. | 123/337 |
| 2008/0035090 A1* | 2/2008 | Suzuki et al. | 123/184.21 |
| 2008/0141980 A1* | 6/2008 | Cho et al. | 123/470 |
| 2009/0101088 A1* | 4/2009 | Yamada | 123/54.4 |
| 2009/0241902 A1 | 10/2009 | Hotta et al. | |
| 2009/0241913 A1 | 10/2009 | Yamagishi | |
| 2009/0241923 A1* | 10/2009 | Yamagishi et al. | 123/579 |
| 2009/0293822 A1* | 12/2009 | Matsuda et al. | 123/54.4 |
| 2009/0314231 A1* | 12/2009 | Kontani et al. | 123/54.4 |
| 2009/0320796 A1* | 12/2009 | Kojima et al. | 123/447 |
| 2010/0126306 A1* | 5/2010 | Ito et al. | 74/607 |
| 2010/0242903 A1* | 9/2010 | Sato et al. | 123/337 |

FOREIGN PATENT DOCUMENTS

| | | |
|---|---|---|
| JP | H03-121250 A | 5/1991 |
| JP | 2009-013885 A | 1/2009 |
| JP | 2009-235933 A | 10/2009 |

* cited by examiner

FUEL FEED SYSTEM FOR V-TYPE ENGINE

CROSS-REFERENCE TO RELATED APPLICATIONS

This application is based upon and claims the benefit of priority of the prior Japanese Patent Application No. 2010-147684, filed on Jun. 29, 2010, the entire contents of which are incorporated herein by reference.

BACKGROUND OF THE INVENTION

1. Field of the Invention

The embodiment discussed herein is directed to a fuel feed system used particularly for a V-type, multi-cylinder engine mounted on motorcycles.

2. Description of the Related Art

A V-type engine often has air intake units disposed in a narrow space called V-bank space, formed between cylinder banks. Each air intake unit is configured by an intake pipe, a throttle body, an air cleaner and so forth as major constituents. The intake pipe is attached with injectors, and the injectors are connected with a delivery pipe as a fuel feed pipe.

Since the delivery pipe is configured to allow a fuel to pass therethrough after being compressed by a fuel pump, so that the delivery pipe has conventionally been fastened to the throttle body typically as described in Japanese Laid-Open Patent Publication No. 2009-235933, so as to avoid accidental detachment of the delivery pipe from the injectors.

Fastening of the delivery pipe so the throttle body is, however, difficult and suffers from poor workability, since the air intake units for the individual cylinder banks are disposed in the narrow V-bank space formed between cylinder banks. In particular, the engine described in Japanese Laid-Open Patent Publication No. 2009-235933 needs fastening of the delivery pipe in a space surrounded by four throttle bodies, enough to make the operation by hands further difficult.

SUMMARY OF THE INVENTION

Considering the above-described situation, it is an object of the embodiment to provide a fuel feed system for a V-type engine, which is excellent in readiness in assemblage, and may be attachable in an appropriate and effective manner.

According to an aspect of the embodiment, there is provided a fuel feed system for a V-type engine having an air intake path disposed in a V-form bank space. The fuel feed system has injectors for jetting therethrough a fuel into the air intake path, and a delivery pipe for feeding therethrough the fuel to the injectors. The delivery pipe is fixed to, and thereby supported by, the engine, while allowing the top portions of the injectors to be fitted into the delivery pipe.

In the fuel feed system for a V-type engine according to the embodiment, the included angle formed between a pair of injectors, opposed on the front and rear sides of the delivery pipe placed in between, is set wider than the bank angle of the cylinder banks as viewed in the longitudinal direction of crankshaft.

In the fuel feed system for a V-type engine according to the embodiment, the delivery pipe is disposed at a position closer to the bottom of the V-form bank space, below the intersection of the axial lines of the pair of injectors opposed on the front and rear sides of the delivery pipe placed in between.

In the fuel feed system for a V-type engine according to the embodiment, an attachment unit of either cylinder bank, for assisting attachment of the injector to the delivery pipe, is designed to be freely detachable from the delivery pipe.

In the fuel feed system for a V-type engine according to the embodiment, direction of attachment and detachment of attachment unit, for assisting attachment of the injector to and from the delivery pipe, is aligned with the depth-wise direction of the V-form bank space.

In the fuel feed system for a V-type engine according to the embodiment, the freely detachable attachment unit for assisting attachment of the injector is disposed so as to be spaced from the closest other injector.

DETAILED DESCRIPTION OF THE PREFERRED EMBODIMENTS

Preferred modes of implementation of the fuel feed system for a V-type engine according to the embodiment will be explained, referring to the attached drawings.

Figure 1:
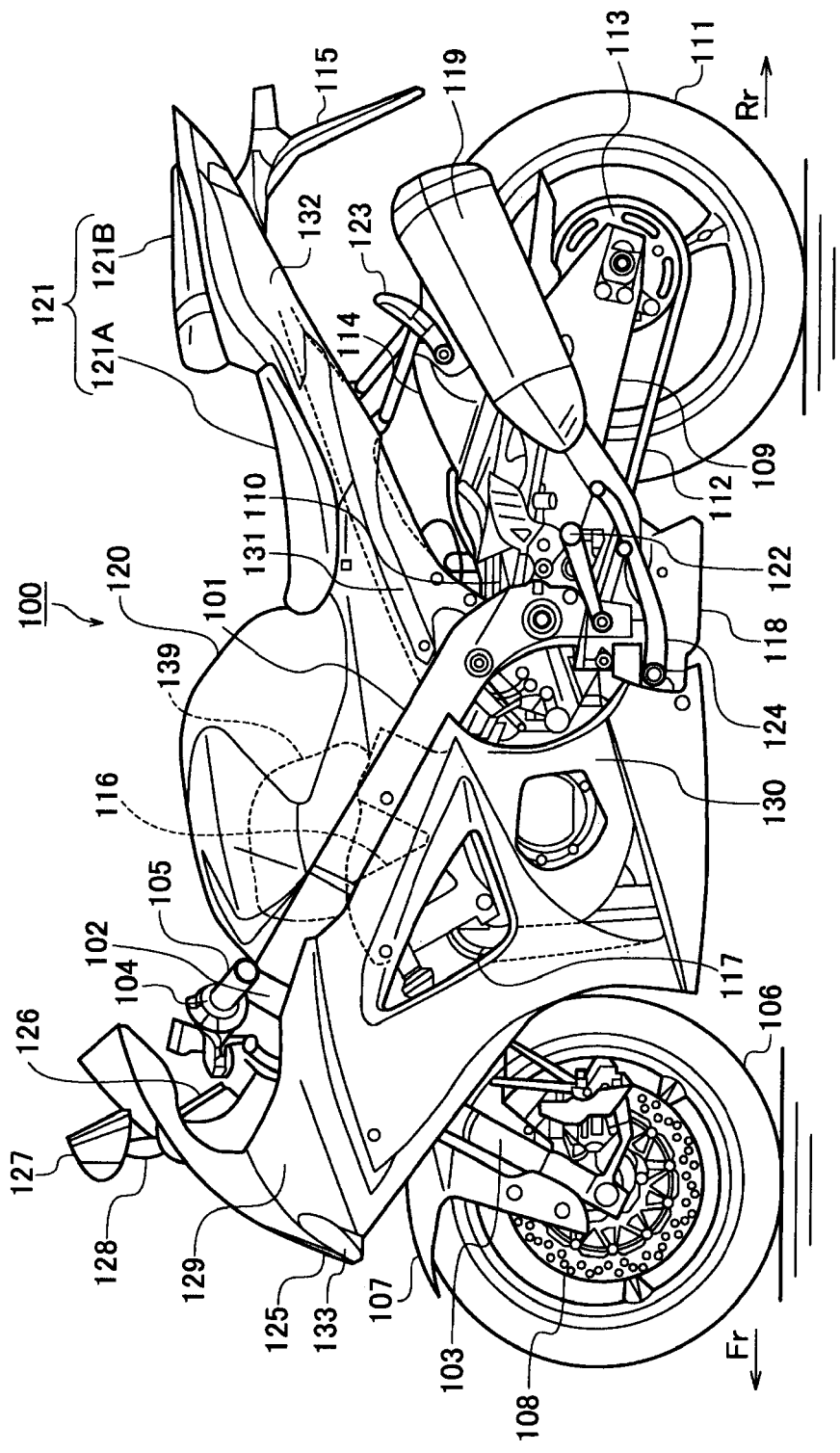
FIG. 1 is a side elevation illustrating an exemplary overall configuration of a motorcycle according to an embodiment.

The fuel feed system of the embodiment is effectively adoptable to various types of gasoline engines to be mounted on four-wheel automobiles. This embodiment will deal with a case of motorcycle engine as illustrated in FIG. 1.

First, an overall configuration of a motorcycle 100 according to this embodiment will, be explained. As seen in FIG. 1, a vehicle frame 101 composed of steel or aluminum alloy has, in the front portion thereof, two front folks 103 provided on the left and right, while being supported by a head pipe 102 in a laterally rotatable manner. A steering bar 104 is fixed on the top ends of the front folks 103, and the steering bar 104 has grips 105 on both ends thereof. To the lower portion of the front folks 103, a front wheel 106 is supported in a rotatable manner, and a front fender 107 is fixed so as to cover the top portion of the front wheel 106. The front wheel 106 has a brake disc 108 which rotates together with the front wheel 106.

The vehicle frame 101 laterally branches at the steering head pipe 102, and each of the halves on the left and right extends backward in a declining manner. At the rear portion of each half of the vehicle frame 101, a swing arm 109 is coupled thereto in a swingable manner, while placing a rear shock absorber 110 in between. At the rear ends of the swing arms 109, a rear wheel 111 is supported in a rotatable manner. The rear wheel 111 is configured to rotate, while being mediated by a driven sprocket 113 having a chain 112 for transmitting motive force of the later-described engine wound therearound. In the close vicinity around the rear wheel an inner fender 114 is provided so as to cover around the front top thereof, and a rear fender 115 is disposed thereabove.

An engine unit 116 (a portion indicated by a dashed line) mounted on the vehicle frame 101 is fed with a fuel-air mixture from the later-described fuel feed system, and an exhaust gas after combustion in the engine is discharged through exhaust pipes 117. In this embodiment, the engine may be a four-cycle, multi-cylinder engine, and may typically be a four-cylinder engine. One possible configuration may be such as having the exhaust pipes 117 of the individual cylinders combined below the engine unit 116, so as to discharge the exhaust gas through an exhaust chamber 118 provided in the succeeding stage, out from a muffler 119 at around the rear end of the vehicle.

A fuel tank 120 is mounted above the engine unit 116, and a seat 121 is provided behind the fuel tank 120. The seat 121 includes a rider's seat 121A, and a tandem seat 121B optionally provided on demand. While a specific configuration of the fuel tank 120, such as geometry and so forth, will be described later, the configuration illustrated in FIG. 1, from which only an overall positional relation may be referred to, may of course be included. Corresponding to the rider's seat 121A and the tandem seat 121B, a foot rest 122 and/or a pillion step 123 are disposed. In the illustrated example, the vehicle has a prop stand 124 on the left lower side of the vehicle body, nearly at the longitudinal center.

Further in FIG. 1, reference numeral 125 stands for a head lamp, 126 for a meter unit which includes a speedometer, a tachometer and various indicator lamps, and 127 for a rearview mirror which is supported by a stay 128 on the steering bar 104.

In the exterior of the vehicle, a fairing 129 and a side cowl 130 mainly cover the front and side portions of the vehicle, a side cover 131 or a seat cowl 132 is attached to the rear portion of the vehicle, and thereby a so-called streamline appearance of the vehicle is given. The fairing 129 has an air intake port 133, through which air is fed no the later-described air cleaner, opened in the front end portion thereof. The exterior configuration of the motorcycle 100 has been explained in the above. Note that the embodiment is adoptable not only to vehicles having such appearance, but also to the others.

Figure 2:
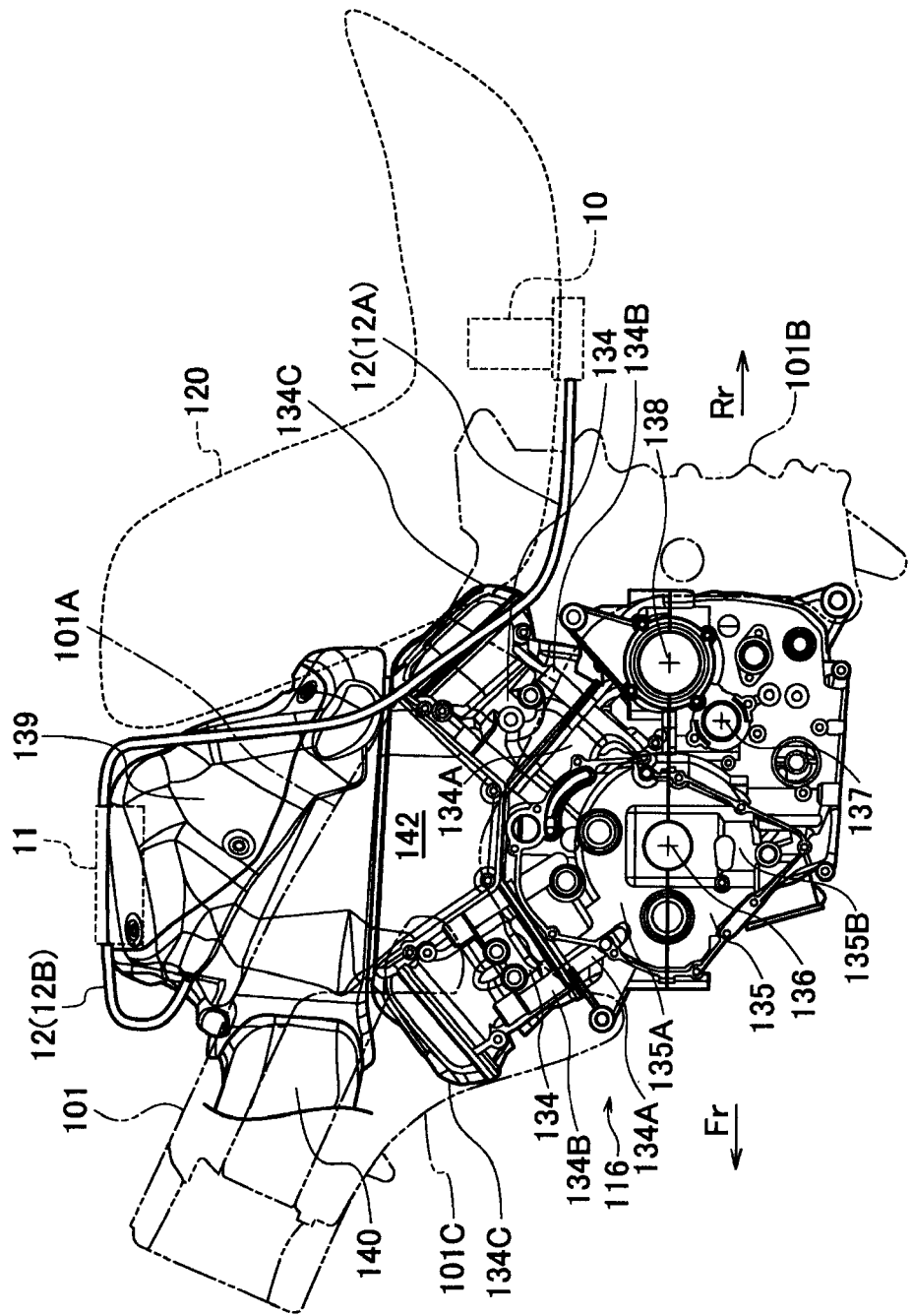
FIG. 2 is a side elevation illustrating an exemplary configuration of an engine and peripheral components of the motorcycle according to the embodiment.
Figure 3:
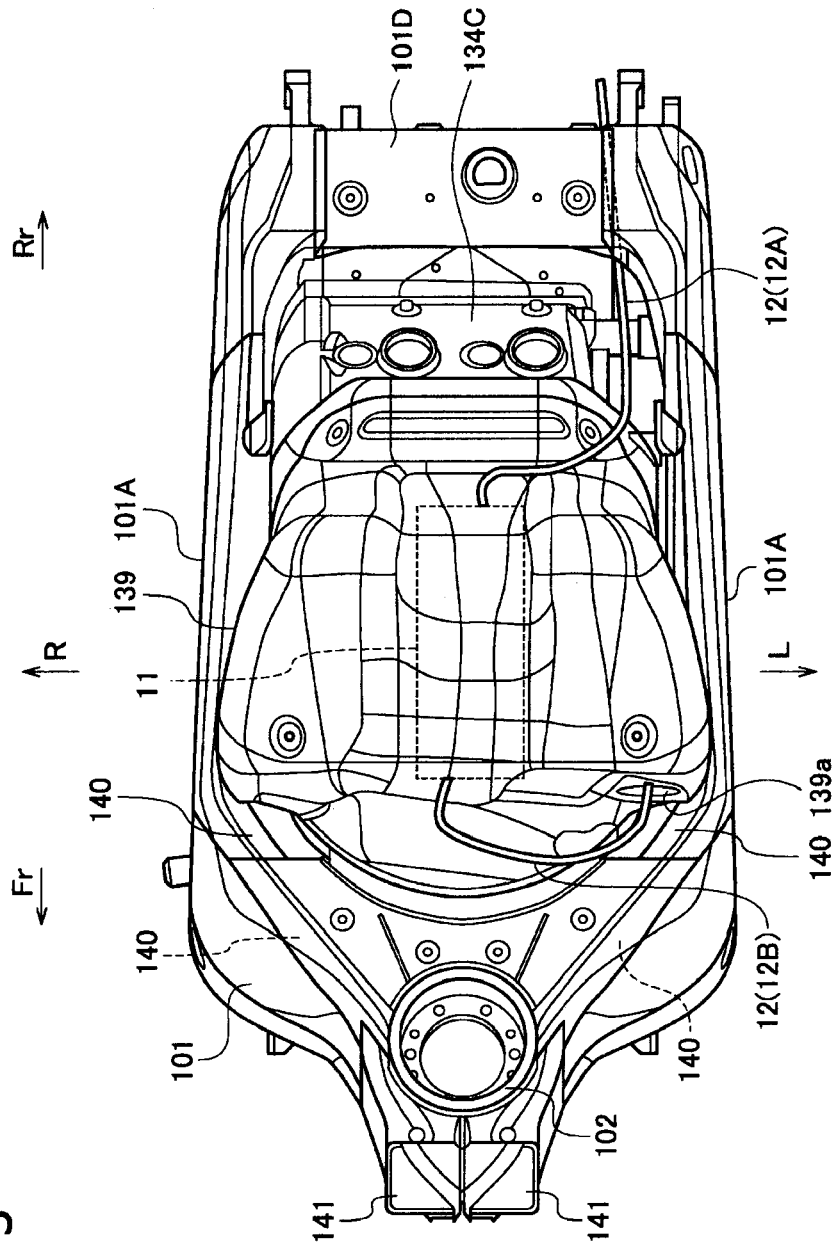
FIG. 3 is a plan view illustrating an exemplary configuration of the engine and the peripheral components of the motorcycle according to the embodiment.

Next, the embodiment of the device will be explained referring to FIG. 2 and succeeding drawings. FIG. 2 and FIG. 3 illustrate an exemplary specific configuration of the engine and peripheral components according to the embodiment. The embodiment deals with a so-called, V-type engine, wherein the engine unit 116 has a V-bank formed by the cylinders disposed on the front and rear sides thereof, or cylinder blocks 134A (side view). To the lower portion of the cylinders 134, a crankcase 135, which is configured by an upper crankcase 135A and a lower crankcase 135B to give a vertically separable configuration, is coupled in an integrated manner. The engine herein is a multi-cylinder engine having two or more cylinders. A front bank and a rear bank are configured by these cylinders. The engine unit 116 is integrally coupled with the vehicle frame 101 while placing a plurality of engine mounts in between, and serves by itself as a rigid member of the vehicle frame 101. The vehicle frame 101 includes a main frame 101A, a body frame 101B and an engine suspension unit 101C, by which the engine unit 116 may be supported in a rigid manner.

To the crankcase 135, a crank shaft 136, a counter shaft 137 and a driving shaft 138 are supported in a freely rotatable manner. These shafts are coupled with each other in the crankcase 135 or in a transmission case with the aid of gears. Output of the engine unit 116 is finally transmitted from the driving shaft 138, via the chain 112, to the rear wheel 111.

Above cylinder head covers of the cylinders 134, an air cleaner 139 through which a clean air is fed to the later-described air intake unit is disposed. The air cleaner 139, having a built-in air filter and so forth, is basically configured to have a hollow structure with a predetermined volume, and is entirely housed and held between the left and right main frames 101A of the vehicle frame 101. The air cleaner 139 has air ducts 140 connected to the front end portion thereof, wherein the air ducts 140 extend from the front end portion of the air cleaner 139, and as illustrated in FIG. 3, open in a form of openings 141 at the front side of the steering head pipe 102. The air ducts 140 between the front end portion of the air cleaner 139 and the openings 141 are configured by the vehicle frame 101 per se, and in Particular by the inner space of the main frames 101A. Portions of the air ducts 140 further extend ahead of the openings 141 open in a form of the air intake port 133 described in the above (see FIG. 1) at the front end portion of the vehicle.

Between the front and rear cylinders blocks 134A, a V-form bank space having an inverted triangular geometry in the side view is formed. On the left and right ends of the V-form bank space, side covers 142 are attached as illustrated in FIG. 2. Above the V-form bank space, the above-described air cleaner 139 is mounted. More specifically, the V-form bank space is closed by the air cleaner 139 and the side covers 142, so as to give a substantially tightly closed space. The inner spaces of the V-form bank space and the air cleaner 139 are communicated, wherein a fuel feed system, an air intake system and so forth are disposed in these spaces.

Figure 4:
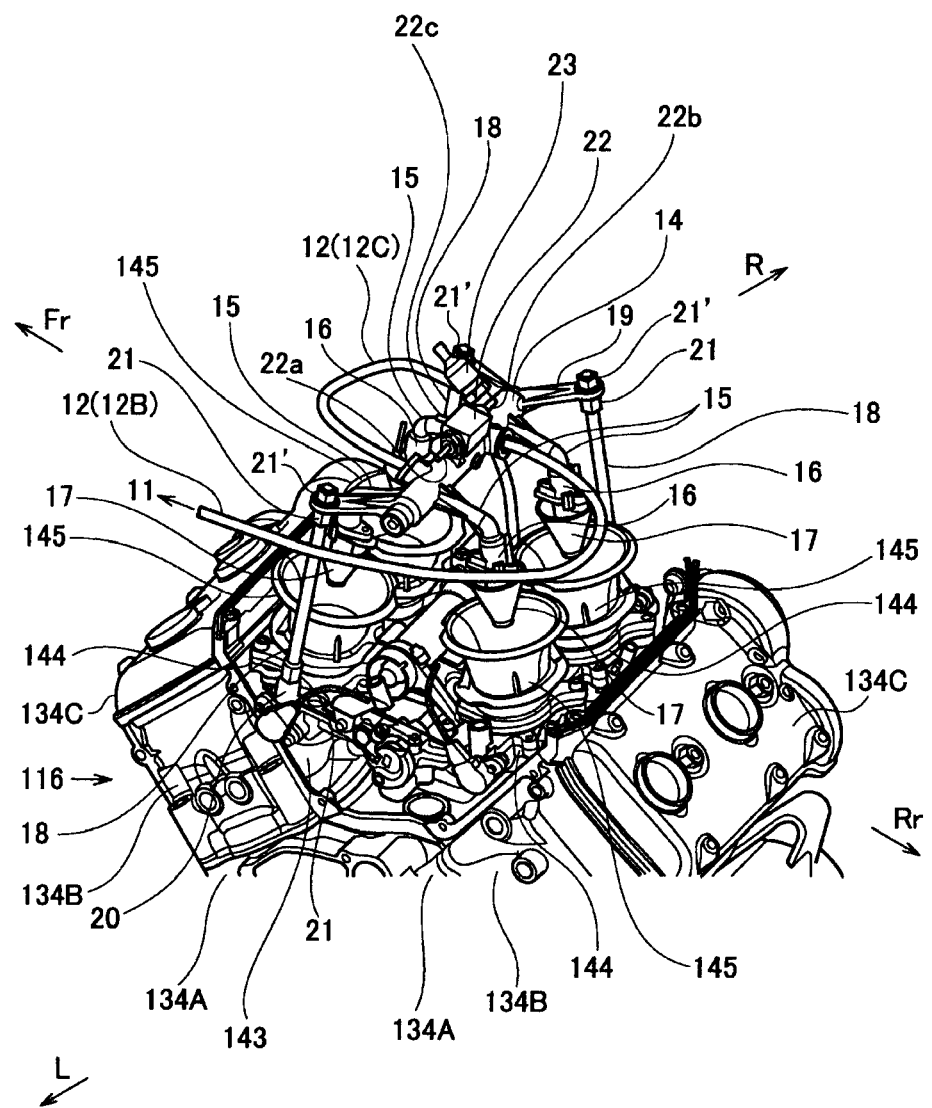
FIG. 4 is a perspective view illustrating an exemplary configuration of a fuel injection unit and peripheral components according to the embodiment.
Figure 5:
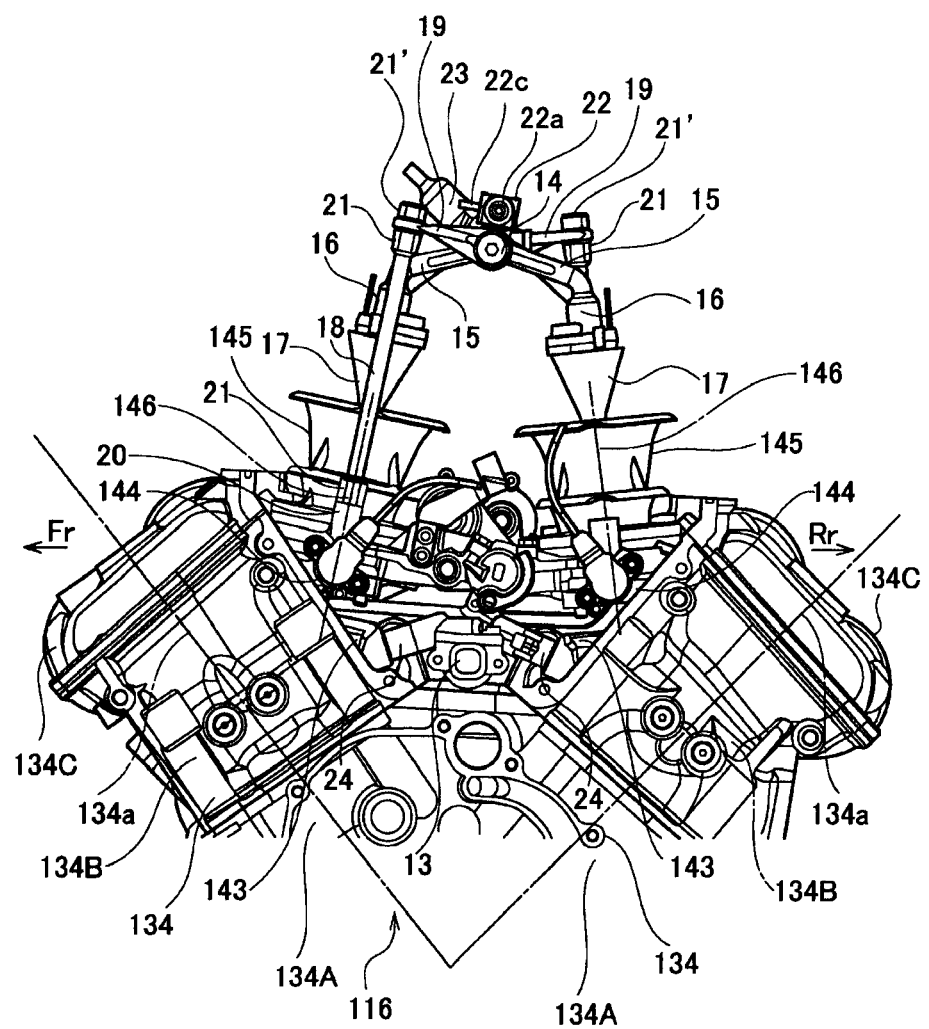
FIG. 5 is a side elevation illustrating an exemplary configuration of the fuel injection unit and the peripheral components according to the embodiment.

The engine unit 116 of this embodiment has a V-type, four-cylinder engine as illustrated in FIG. 4 and FIG. 5, and each of the front and rear cylinder banks has two cylinders 134 installed side by side. Each cylinder 134 has an intake pipe 143 provided so as to protrude into the V-form bank space, and a throttle body 144 and a funnel 145 are sequentially disposed, while being coupled with each other, above the intake pipe 143 in the upstream side when viewed along the air flow. The inner spaces of these components communicate with each other, so as to form an air intake path as illustrated in FIG. 5, which is laid around an axis 146 of the air intake path schematically indicated by a dashed line, and is connected to an intake port of each cylinder 134. To these air intake paths, a fuel is fed from the fuel feed system, and air is fed by the air intake unit.

In each cylinder 134 of the cylinder bank, the cylinder block 134A, a cylinder head 134B and a cylinder head cover 134C are integrally coupled along an axis 134a.

In the fuel feed system, the fuel in the fuel, tank 120 is sucked up by a fuel pump, and fed to a fuel injection unit. As illustrated in FIG. 2 and FIG. 3, the fuel tank 120 has a fuel pump 10 on the lower pressure side disposed therein, and the air cleaner 139 has a fuel pump 11 on the higher pressure side disposed in a recess on the top surface thereof. The fuel, tank 120 in this embodiment has, as illustrated in FIG. 2, a nearly L-form in a side view, and has the fuel pump 10 on the lower pressure side disposed on the bottom thereof. The fuel pump 10 in the lower pressure side and the fuel pump 11 on the higher pressure side are connected through a fuel hose 12

(12A). The left and right body frames 101B are coupled by a bridge pipe 101D, and the fuel hose 12A is laid so as to extend once below the bridge pipe 101D and to reach the fuel pump 11 on the higher pressure side. The fuel pumps 10, 11 are disposed at considerably different levels of height as illustrated in the drawing, so that the fuel in the fuel tank 120 is once fed by the fuel pump 10 on the lower pressure side up to the fuel pump 11 on the higher pressure side.

The fuel pump 11 on the higher pressure side has a fuel hose 12 (12B) connected thereto, so that the fuel is fed through the hose 12B to an injector configuring the fuel injection unit. The fuel hose 12B in this configuration is drawn through an opening 139a (FIG. 3), provided to the upper portion of the front end face of the air cleaner 139, into the air cleaner 139, and feeds the fuel respectively to a primary delivery pipe 13 on the downstream side and a secondary delivery pipe 14 on the upstream side, which are vertically disposed at the longitudinal center of the V-bank space as illustrated in FIG. 4 and FIG. 5. In this configuration, the fuel hose 12B is first connected to the secondary delivery pipe 14, and the secondary delivery pipe 14 and the primary delivery pipe 13 are connected by a junction fuel hose 12C.

The explanation below will begin with the secondary injector and the peripheral components in FIG. 4 to FIG. 6. The secondary delivery pipe 14 is laid in the lateral direction above the V-form bank space, typically branched into four feed pipes 15 corresponded to the individual cylinders, so as to give a four-legged geometry as a whole, and each feed pipe 15 has a secondary injector 16 provided at the end thereof. In this configuration, each secondary injector 16 is attached so as to align a jetting port thereof with the axis 146 of air intake path. The axes 146 of air intake paths are set, as illustrated in FIG. 5, so as to appropriately incline and to thereby increasingly come apart from each other towards the downstream side of air flow, rather than being kept in parallel with each other. When viewed in the longitudinal direction, the axis 146 of air intake path coincides with the axis 134a of the cylinder 134. Each secondary injector 16 is further provided with a near-conical or conical air guide 17 narrowed towards the downstream side of air flow, so as to regulate the air flow.

The secondary delivery pipe 14 is supported by a plurality of support bars 18 so as to keep the above-described arrangement. The illustrated configuration has three support bars 18. In this configuration, three supporting arms 19 extend in near-horizontal and near-longitudinal directions on both lateral sides of the secondary delivery pipe 14, and the individual supporting arms 19 are supported at the ends thereof by the support bars 18. While three sets of support bars 18 and the supporting arms 19 are used, four sets may alternatively be used.

Figure 6:
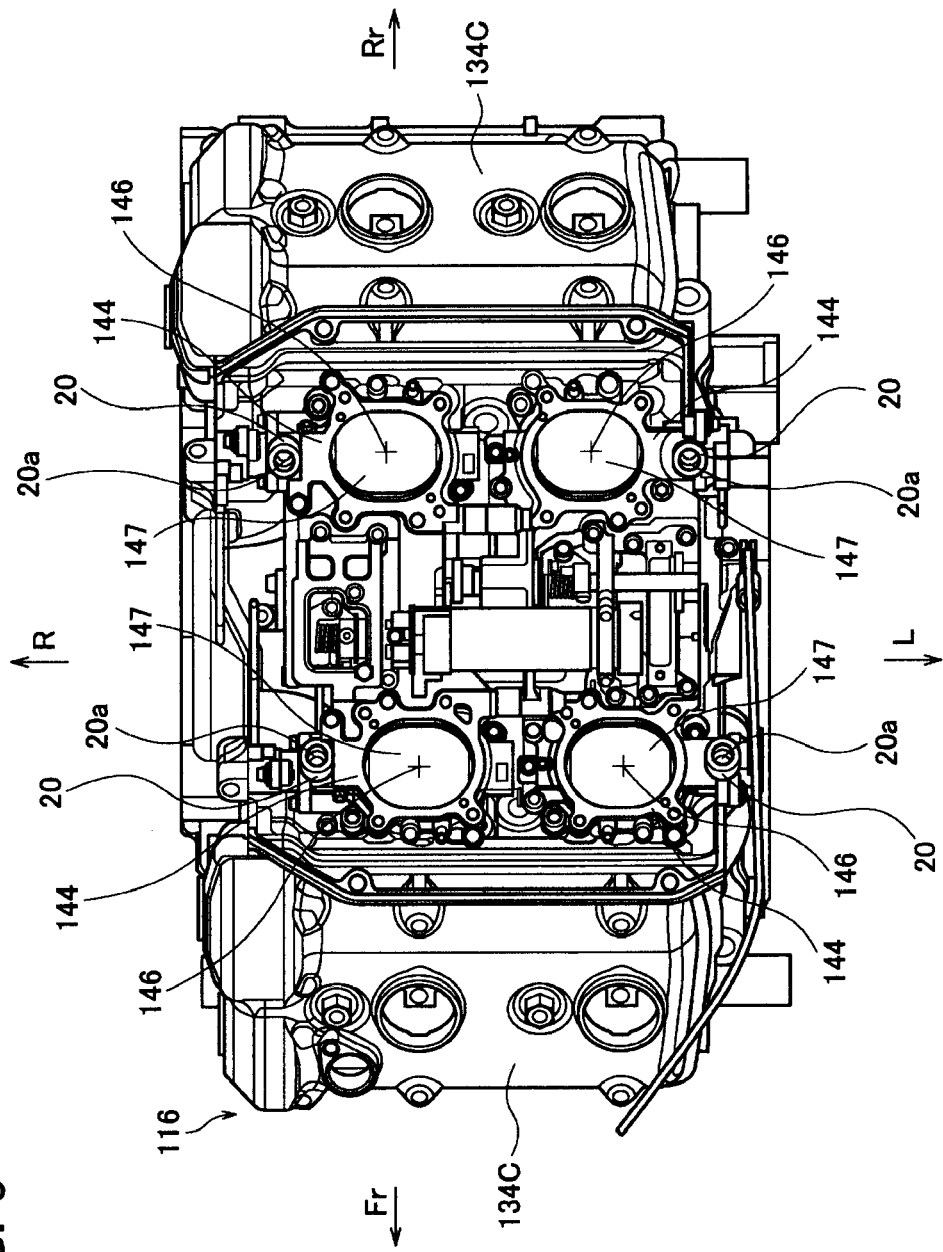
FIG. 6 is a plan view illustrating an exemplary configuration of the fuel injection unit from which funnels were detached according to the embodiment.

FIG. 6 is a plan view illustrating an exemplary configuration of the fuel injection unit from which the funnels 145 were detached. In the vicinity of the right or left side exterior of each air intake path formed in each throttle body 144, a boss 20 to which the support bar 18 is attached and supported is provided in a protruding manner. The throttle body 144 has a throttle valve 147, for adjusting the aperture of the internal air intake path, attached thereto. Each boss 20 is formed integrally with each throttle body 144, and has a fitting hole 20a in which the support bar 18 is supported. The support bar 18 and the supporting arm 19 or the boss 20 may be coupled typically by threading the support bars 18 at the top and bottom ends thereof, using a fastener or adjusting nuts 21, 21'.

The support bars 18 are set in an inclined manner, as illustrated in FIG. 5, so as to make themselves coincide with she axis 146 of air intake path in a side view, rather than being kept in parallel with each other. The supporting arm 19 which extends in the longitudinal direction from the secondary delivery pipe 14 is disposed in a near-horizontal manner, so that bearing surfaces of the fastener or the adjusting nuts 21, 21' are not in parallel with each other between the front and rear sides of the cylinder bank, but are inclined from each other corresponding to the angle of inclination of the support bars 18. Accordingly, the secondary delivery pipe 11 to be assembled with the throttle bodies 144 may more readily be aligned in the longitudinal direction, and thereby positioning accuracy of the secondary injector 16 with respect to she funnel 145, and consequently to the air intake path 146, may effectively be improved.

In this configuration, a pressure/intake temperature sensor 22 is mounted on the top surface of the secondary delivery pipe 14, at around the lateral center thereof. The pressure/intake temperature sensor 22 is configured to detect negative pressure in the throttle bodies 144, and to detect intake temperature in the air cleaner 139. The pressure/intake temperature sensor 22 has connection ports 22a, 22b provided so as to laterally protrude out therefrom, to which unillustrated hoses which extend into the left and right throttle bodies 144 are connected, so as to enable detection of negative pressure in the throttle bodies 144. The pressure/intake temperature sensor 22 has also a detection port 22c provided so as to protrude frontward, for the convenience of detection of intake temperature in the air cleaner 139. On the right hand side of the pressure/intake temperature sensor 22 and in the vicinity thereof, a fuel pressure sensor 23 is attached aimed at detecting fuel pressure in the secondary delivery pipe 14.

Figure 7:
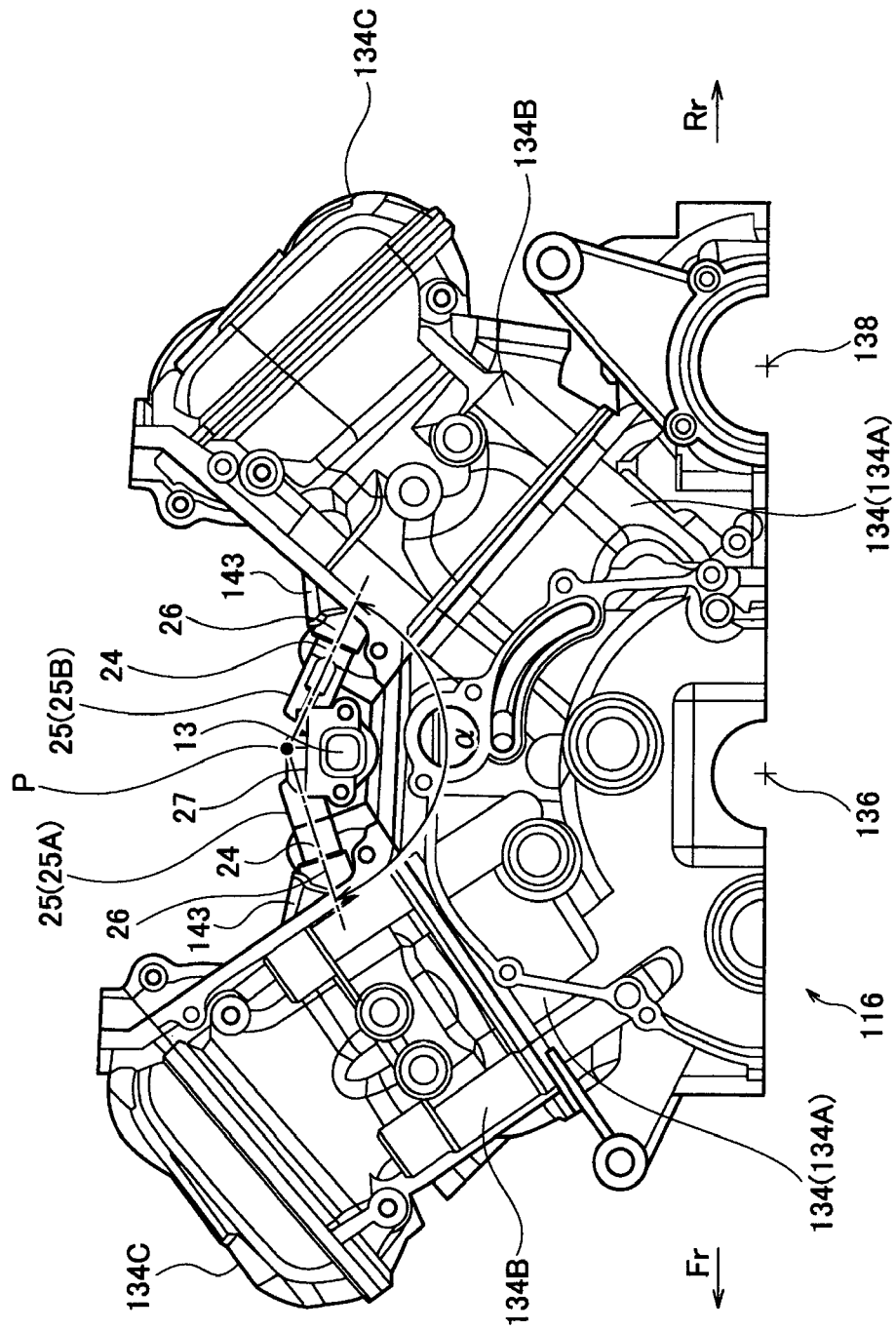
FIG. 7 is a side elevation illustrating an exemplary configuration of a primary injector and peripheral components in the fuel injection unit according to the embodiment.
Figure 8:
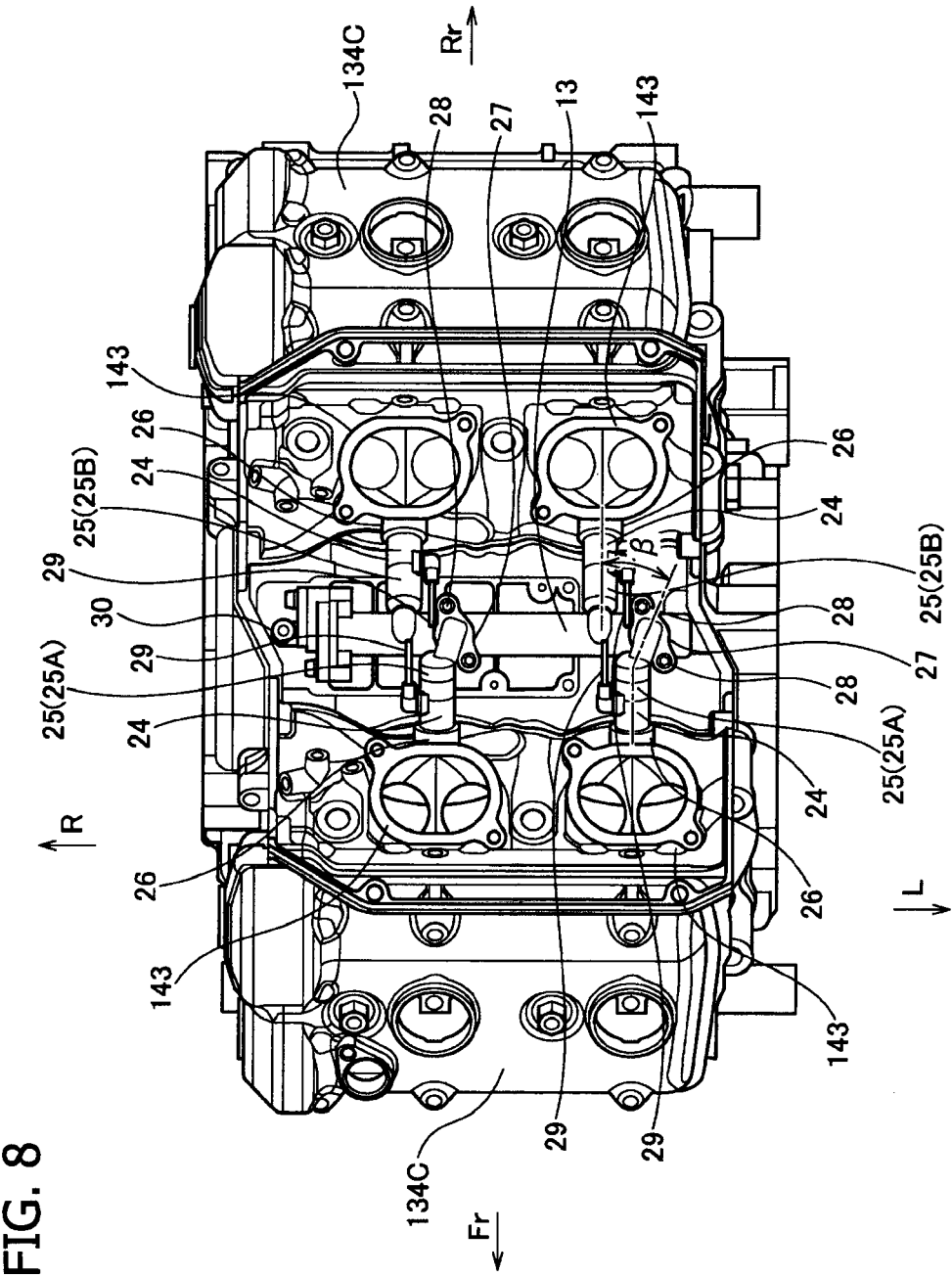
FIG. 8 is a plan view illustrating an exemplary configuration of the primary injector and the peripheral components in the fuel injection unit according to the embodiment.

Next, the primary injectors and peripheral components illustrated in FIG. 7 and FIG. 8 will be explained, occasionally referring also to FIG. 4 to FIG. 6. FIG. 7 and FIG. 8 are a side elevation and a plan view, respectively, observed after removing the throttle bodies 144 and the related components. The primary delivery pipe 13 is laid in the lateral direction at around the center bottom of the V-form bank space, and to which the primary in injectors 24 are attached, and thereby supported thereon, corresponding to the individual cylinders, so as to longitudinally extend towards the intake pipe 143.

A feature of the support structure or the primary delivery pipe 13 to be mentioned first is that the primary delivery pipe 13 is supported by attaching each primary injectors 24, without special provision of any attachment unit for the peripheral components including the throttle bodies 144. For example, each primary injector 24 is attached to the primary delivery pipe 13 while placing an attachment 25 in between. Each attachment 25 has a fitting hole which allows the top portion of the primary injector 24 to fit thereinto. The individual attachments 25 are disposed higher above the primary delivery pipe 13. Each intake pipe 143 has an attachment portion 26 with an insertion hole 26a into which the end portion of each primary injector 24 is inserted.

In this embodiment, an attachment 25A disposed closer to the front cylinder bank is attached to the primary delivery pipe 13 in a freely detachable manner. More specifically, the attachment 25A has a flange-like adopter 27 integrally provided thereto. The adopter 27, and consequently the attachment 25A, is designed to be fastened and fixed on the top surface of the primary delivery pipe 13 using a pair or bolts 28. An attachment 25B disposed closer to the rear cylinder bank is formed integrally with the primary delivery pipe 13.

The primary delivery pipe 13 is laid at the bottom of the V-form bank space as described in the above, and also the individual attachments 25 coupled so the primary delivery pipe 13 are disposed similarly on the bottom side of the V-bank space. In this embodiment, while the bank angle between the front and rear cylinder banks is set around 90°, an included angle formed between the primary injectors 24 attached to the front and rear cylinder banks, or an angle α formed by the axial lines of the primary injectors 24, is set larger than the bank angle between the cylinder banks, as seen in the side elevation illustrated in FIG. 7. More specifically, the angle α may be set as large as 180°. In all cases, the primary delivery pipe 13 is laid below an intersection P of the axial lines of the front and rear primary injectors 24, as viewed in the longitudinal direction of crankshaft.

The adopter 27 is disposed, as illustrated in FIG. 8, so as to incline the attachment 25A by angle β away from the closest opposing primary injector 24, that is, so as to be skewed by angle β away from the axial line of such primary injector 24. By skewing the adopter 27 in this way, a larger parting space may be ensured between the adjacent or opposing primary injectors 24 and the attachments 25B. Since each primary injector 24 has wire harnesses 29 for operational control connected thereto, so that connecting portions of the wire harnesses 29 may be disposed close to each other as illustrated in FIG. 8, and may thereby be integrally drawn making use of such parting space.

To the end of the primary delivery pipe 13, in the longitudinal direction thereof, which is the right end in the illustrated example of FIG. 3, a connector 30 for assisting connection of a junction fuel hose 12C is attached. Through the fuel hose 12C connected to the connector 30, a fuel is fed to the primary delivery pipe 13.

In this configuration, each throttle body 144 has the throttle valve 147 (see FIG. 6) for opening and closing the air intake path 146, attached thereto as described in the above. While a mechanical or electronic regulator for regulating the throttle valves 147 is additionally provided, it will not be explained herein.

Next, operations and so forth of the thus-configured fuel feed system of the embodiment will be explained. As described in the above, the V-form bank space and the inner space of the air cleaner 139 has the fuel feed system and the air intake unit which contain a large number of components. How efficiently are such large number of components arranged in a limited size of space is a critical problem. In particular, the V-form bank space is narrowed towards the bottom, and the geometry largely affects readiness in attachment and assemblage of the components.

Now, embodiment of the fuel feed system of the embodiment, and in particular procedures of attachment and assemblage of the primary delivery pipe 13 and the peripheral components will be explained first, referring to FIG. 9.

Figure 9:
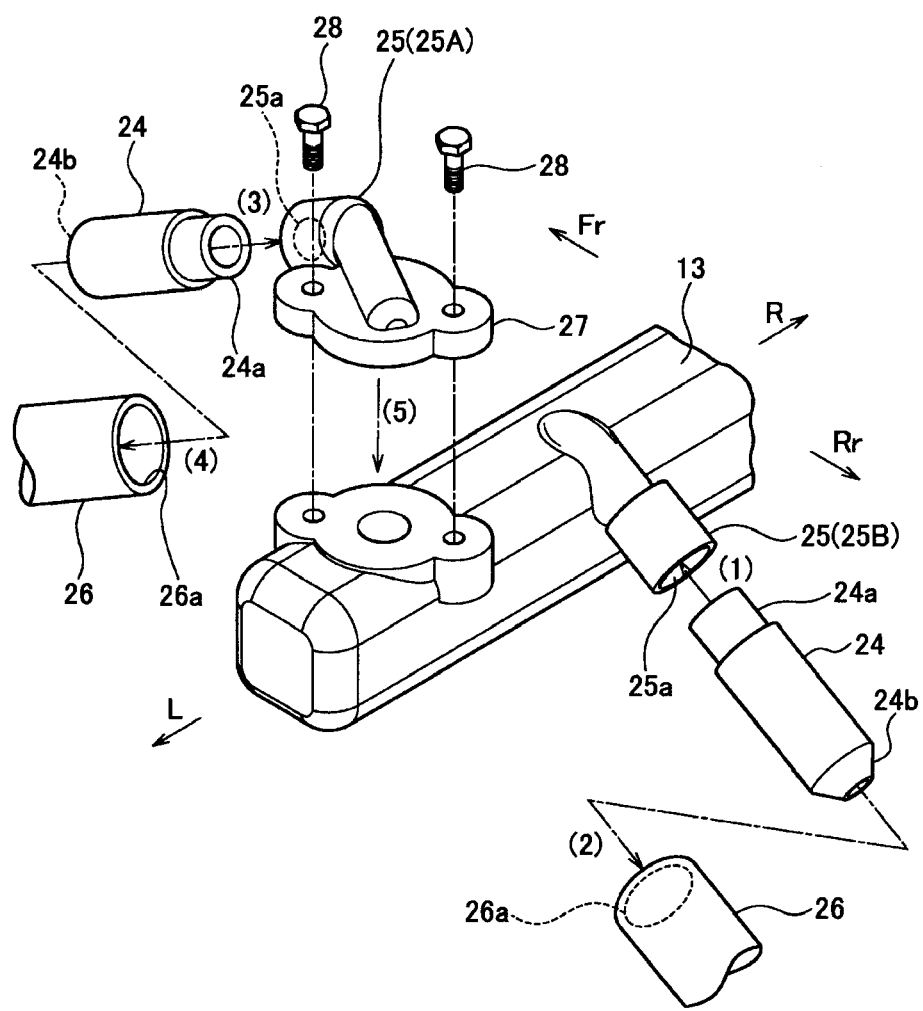
FIG. 9 is a perspective view illustrating an exemplary assembly of the injector in an injector-fixed structure according to the embodiment.

Procedures (1) to (5) in FIG. 9 represent typical example of the embodiment. While the drawing illustrates only the left side of the primary delivery pipe 13, also the unillustrated right side is substantially same. First, in Procedure (1), the upper end 24a of the primary injector 24 is fitted to the fitting hole 25a of the attachment 25B for the rear cylinder bank. In procedure (2), an end portion 24b of the primary injector 24 is inserted into the insertion hole 26a of the attachment portion 26 of the intake pipe 143 for the rear cylinder bank, and thereby the primary delivery pipe 13 is once supported at the longitudinal center of the V-bank space, while being laterally aligned.

Figure 10:
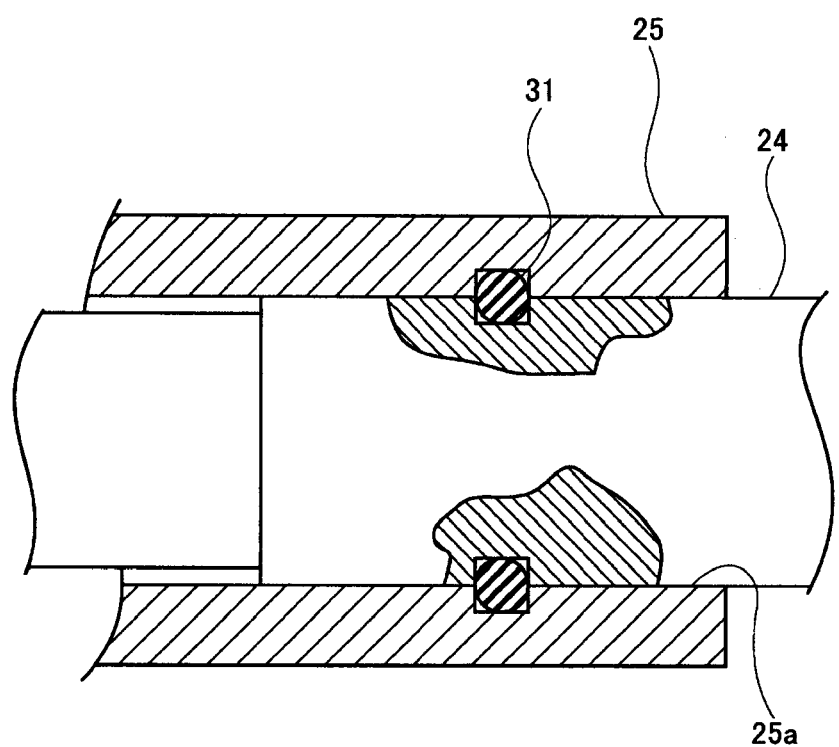
FIG. 10 is a sectional view illustrating an exemplary seal structure of the injector in the injector-fixed structure according to the embodiment.

A watertight structure, configured by the primary injector 24 together with the attachment 25 or together with the attachment portico 26, may adopt an O-ring or the like. For example, as illustrated in FIG. 10, an O-ring 31 may be placed around the upper end 24a of the primary injector 24, so as to keep watertightness of the primary injector 24.

Next, in procedure (3), the upper end 24a of the primary injector 24 is fitted to the fitting hole 25a of the attachment 25A for the front cylinder bank. In procedure (4), the end portion 24h of the primary injector 24 is inserted into the insertion hole 26a of the attachment portion 26 of the intake pipe 143 for the front cylinder bank. Lastly, the adopter 27 is placed on a bearing portion provided on the top surface of the primary delivery pipe 13, and adopter 27, and consequently the attachment 25A, is fixed to the primary delivery pipe 13 by fastening using the bolts 28. In this way, the primary delivery pipe 13 and the primary injectors 24 may appropriately be aligned and fixed to a predetermined position in the V-form bank space.

In the thus-configured fuel injection unit of the embodiment, the primary delivery pipe 13 is disposed so as to bridge the opposing upper ends 24a of the primary injectors 24 attached to the front and rear cylinder banks. In this configuration, the primary delivery pipe 13 and the primary injectors 24 may be attached in an appropriate manner, only simply by fitting the primary injectors 24 with the attachments 25, or with the attachment portions 26. In this configuration, since the primary delivery pipe 13 per se has no attachment unit, for assisting attachment to the peripheral components including the throttle body 144, and is therefore simplified, so that a plurality of components may very efficiently be assembled in a narrow V-bank space.

In the fuel injection unit thus assembled in the V-form bank space, as illustrated in FIG. 7, the included angle (angle α) between the primary injectors 24 was set larger than the bank angle between the cylinder banks when viewed in the longitudinal direction of crankshaft. This means that the axial lines of the opposing primary injectors 24 of the front and rear cylinder banks are aligned nearly on a straight line. Now, the pressure of fuel to be fed through the primary injectors 24 is set to a very high level, such as 10 atm or around. According to the embodiment, reaction forces possibly generated in the process of feeding the compressed fuel, from the primary delivery pipe 13 to the opposing primary injectors 24 of the front and rear cylinder banks may be canceled. Since the configuration adopts no fastening structure with respect to the peripheral components as described in the above, so that the primary delivery pipe 13 per se may be attached, while successfully preventing accidental detachment or fuel leakage.

Note that widening of the included angle of the primary injectors 24 without further consideration may make it difficult to attach the primary delivery pipe 13 to the primary injectors 24, so far the primary injectors 24 stay attached to the intake pipe 143, due to interference among the components. In contrast in the embodiment, the primary delivery pipe 13 may be attached to the cylinder head 134B in a smooth and appropriate manner, despite of widening of the angle, by configuring the primary delivery pipe 13 as separable, and by configuring the attachment 25A, which is an attachment unit for the primary injector 24 of one cylinder bank, the front cylinder bank herein, as detachable from the body of the delivery pipe with the aid of the adopter 27.

In addition, since the primary delivery pipe 13 in the embodiment is laid below the intersection of the axial lines of a pair of opposing primary injectors 24, when viewed in the longitudinal direction of crankshaft, so that the primary delivery pipe 13 may surely be prevented from having vapor in fuel stagnated therein. In other words, an upper end 24a of each primary injector 24, which serves as a fuel inlet is positioned higher than the primary delivery pipe 13. When vapor contained in the compressed, fuel is fed into the primary delivery pipe 13, the vapor having a lower density and a smaller specific gravity than those of the fuel rises up from the primary delivery pipe 13 positioned lower, sent through the upper ends 24a into the primary injectors 24, and is then jetted out from the primary injectors 24 together with the fuel. Since the vapor in the fuel may surely be discharged in an early stage, so that problems such as shortage of fuel and destabilized fuel pressure due to stagnation of the vapor in the primary delivery pipe 13 may be avoidable.

Since the injector attachment unit for one cylinder bank, disposed ahead of the body of the primary delivery pipe, was configured to be detachable, so that the injector attachment unit per se is necessarily fastened to the body of the delivery pipe. By setting the direction of fastening of the injector attachment unit on one side so as to be aligned nearly with the depth-wide direction of the V-bank space which is represented by the center plane between the cylinder banks, interference with the peripheral components may successfully be avoidable, and attachment/detachment works of the primary delivery pipe 13 may be facilitated.

Moreover, in a plan view, the upper end 24a which is a base portion of the primary injector 24 is inclined away from the other closest primary injector 24, into a direction defined by angle β by skewing the angle of attachment portion. By expanding the space for attachment to a sufficient degree in this way, the injector attachment unit for the cylinder bank on one side may more readily be fastened onto the primary delivery pipe 13. In this way, the wire harnesses 29 may be disposed between the primary injectors 24 in the closest vicinity, allowing intensive cabling of the wire harnesses 29, substantial reduction in size of the system, and improved convenience of the cabling.

The embodiment was described in the above referring to various modes of implementation. The embodiment is, however, not limited to the above-described modes of implementation, and allows modifications in various ways without departing from the scope of thereof.

While the above-described modes of implementation dealt with an exemplary case where the attachment 25A of the front cylinder bank is configured to be detachable with respect to the primary delivery pipe 13, conversely the attachment 25B of the rear cylinder bank may be configured in a detachable manner.

According to the embodiment, a plurality of components may very efficiently be assembled in a narrow V-bank space, while simplifying the configuration. Also the assemblage or attachment works may be facilitated. Correct and appropriate attachment improves operability of the system as a consequence.

What is claimed is:

1. A fuel feed system for a V-type engine having an air intake path disposed in a V-form bank space, the fuel feed system comprising:
   injectors attached to at least one of the air intake path or peripheral components and thereby supported thereon, that jet therethrough a fuel into the air intake path; and
   a delivery pipe that feeds therethrough the fuel to the injectors, wherein
   the delivery pipe is disposed proximate to the air intake path solely by the injectors, and
   the delivery pipe is fixed to the engine only with the injectors by fitting top portions of the injectors to the delivery pipe, and thereby supported by the injectors,
   an attachment unit for an injector of the injectors on either one side of a cylinder bank forms a parting space by spacing a connecting portion with the delivery pipe from a closest other injector and another attachment unit for the closest other injector; and
   wire harnesses connected to each of the injectors and each of the wire harnesses extending from the injector on the one side and the other injector, in a top view, extends towards the delivery pipe, and is disposed in the parting space, allowing intensive cabling of the wire harnesses.

2. The fuel feed system for a V-type engine according to claim 1, wherein an included angle formed between the injector on the one side and the other injector, opposed on front and rear sides of the delivery pipe placed in between, is set wider than a bank angle of cylinder banks to be an obtuse angle as viewed in a longitudinal direction of crankshaft.

3. The fuel feed system for a V-type engine according to claim 2, wherein the delivery pipe is disposed at a position closer to a bottom of the V-form bank space, below an intersection of axial lines of the injector on the one side and the other injector opposed on the front and rear sides of the delivery pipe placed in between.

4. The fuel feed system for a V-type engine according to claim 1, wherein the attachment unit for the injector on the one side is configured to be separate from the delivery pipe and is designed to be freely detachable from the delivery pipe.

5. The fuel feed system for a V-type engine according to claim 4, wherein a direction of attachment and detachment of the freely detachable attachment unit, assisting attachment of the injector to and from the delivery pipe, is aligned with a depth-wise direction of the V-form bank space.

6. The fuel feed system for a V-type engine according to claim 4, wherein an pipe axis of the attachment unit for the injector on the one side is disposed as to be inclined with respect to an axis of the injector in a plan view.

7. The fuel feed system for a V-type engine according to claim 6, wherein:
   the parting space is ensured by inclining the pipe axis of the attachment unit for the injector on the one side.

8. The fuel feed system for a V-type engine according to claim 4, wherein:
   the delivery pipe includes a bearing portion permitting fastening the attachment unit,
   the attachment unit allows the top portion of the injector on the one side to be fitted into the attachment unit in a freely detachable manner,
   the delivery pipe allows the top portion of the other injector opposing to the injector on the one side to be fitted into the delivery pipe in a freely detachable manner,
   after fitting the top portion of the injector on the one side into the attachment unit and fitting the top portion of the other injector into the delivery pipe, by fastening the attachment unit to the bearing portion of the delivery pipe, the attachment unit and the delivery pipe is fixed to the engine respectively.

9. The fuel feed system for a V-type engine according to claim 1, wherein the delivery pipe is located below a throttle body for feeding air for combustion into a cylinder, and positioned at bottom side of the V-form bank space.

* * * * *